UNITED STATES PATENT OFFICE.

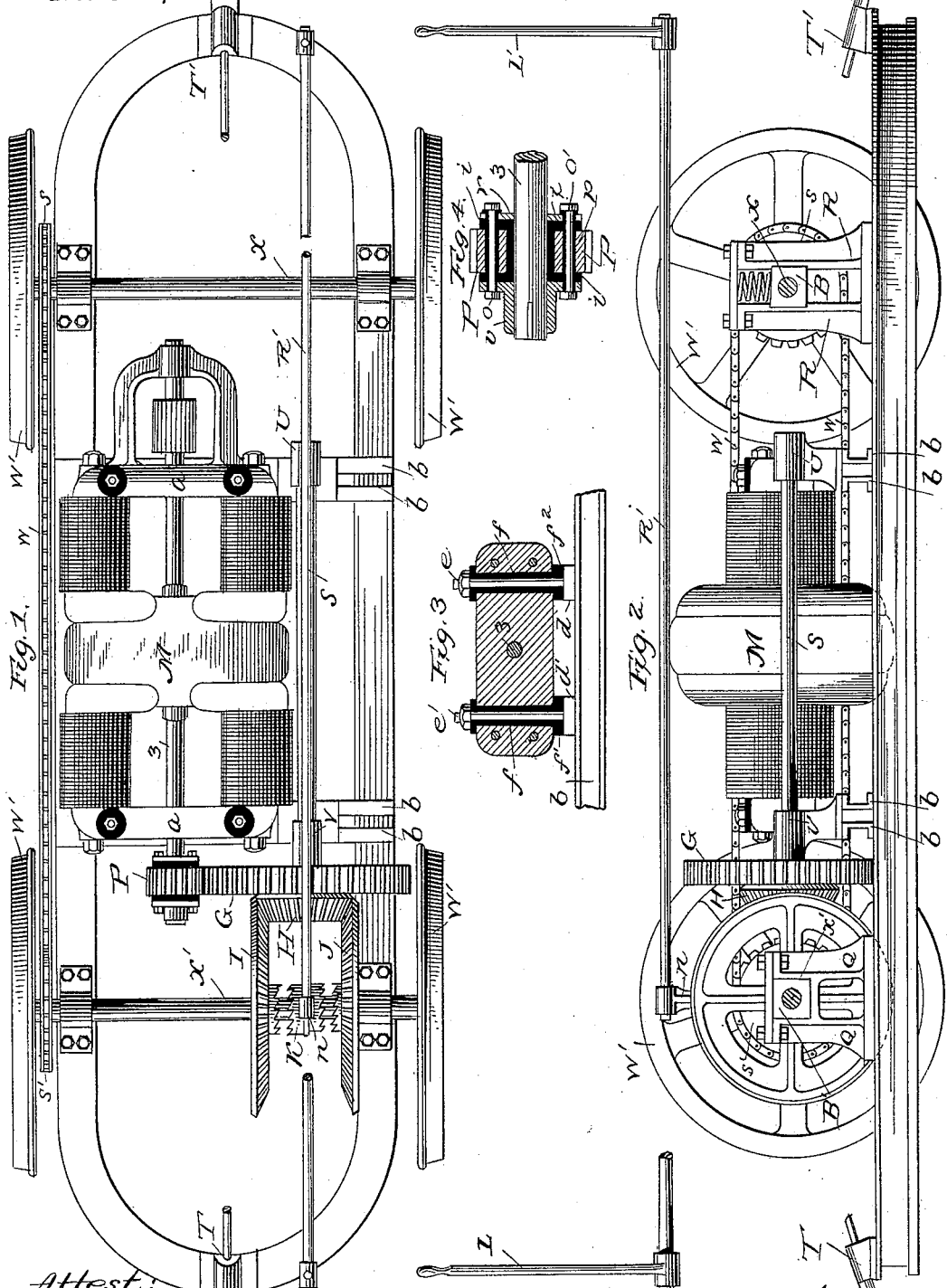

SIDNEY HOWE SHORT, OF DENVER, COLORADO, ASSIGNOR TO THE UNITED STATES ELECTRIC COMPANY, OF SAME PLACE.

ELECTRIC LOCOMOTIVE.

SPECIFICATION forming part of Letters Patent No. 394,887, dated December 18, 1888.

Application filed October 23, 1886. Serial No. 217,016. (No model.)

*To all whom it may concern:*

Be it known that I, SIDNEY HOWE SHORT, of Denver, in the county of Arapahoe and State of Colorado, have invented a new and useful Improvement in Electric Locomotives; and I do hereby declare that the following is a full, clear, and exact description of the same.

In an electric locomotive there are several things which are necessary in the construction in order to make a machine which will stand the wear and tear to which locomotives are subject.

An electric locomotive which is designed to carry upon its trucks only one coach should be made as light as possible. To get the greatest efficiency from the motor, an electric motor should be run at a high speed, using small quantity of current and high tension or electro-motive force. In order to be able to gear down from a high-speed motor-shaft to the slow-running axles of the locomotive, it is necessary to have some efficient means of gearing to transmit the power. Because of the nicety with which the brushes of a motor must be set to make it develop its maximum power with economy, it is not practicable to reverse the motor by changing the position of the brushes. The change in the direction of the locomotive can best be made in the gearing. For climbing steep grades provision must be made for using all the wheels as drivers, so that slipping will not occur. The frame of the locomotive must have rigidly attached to it the journals in which the axles run, to which the gearing is fastened. The other axle, however, must have its journals provided with spring-pedestals, so that all the wheels may tread on the rails. Where motors are run in series with one another upon a single-line conductor on which the tension is high and the insulation good, it is necessary to insulate the motor itself from the iron-work of the frame and the gearing, because the static charge of the line tends to break the insulation of the motor.

It is the object of this invention to meet the requirements above explained.

Referring to the accompanying drawings, Figure 1 represents a plan, and Fig. 2 a side elevation, partly in section, of the electric locomotive. Figs. 3 and 4 show details of construction.

The supporting-frame of the locomotive is mainly composed of a beam bent around at the ends and returning in to itself, so that it may be formed of a single piece. I prefer to make this frame out of ordinary T-rail used upon railways, arranged in an inverted position, as shown in the drawings. This gives a broad bearing suitable for the attachment of the parts on the upper side, and at the same time affords cross-beams of great strength. Upon this frame are set inverted cheek-pieces or pedestals. These pedestals are bolted to the flanges of the rail-beam, as shown in Fig. 1, in an inverted position. One pair of these pedestals, marked Q, is formed with a cross-bar, which with the strap across the ends holds the bearing-blocks B' rigidly to the pedestal. In the other pair of pedestals, R, the bearing-blocks B are arranged to slide between the opposite faces of the pedestal and above the block, and between it and the strap across the end of the pedestal is an interposed spring. One end of the frame is supported upon one pair of wheels rigidly, the axle $x'$ turning in the bearing-blocks B'. The other end of the frame is supported upon the axle $x$, which turns in the movable blocks B, and the frame is supported upon these blocks between the interposed springs. The wheels $w'$ are fixed to the outer ends of the axles, and in the center of the rounded ends of the frame are the appliances T T' for supporting and moving the current-gatherer, or for the attachment of pilots. They consist of sockets secured to the frame adapted to receive the spindles of the driving-rods of the current-gatherer or of the pilots. Between the pairs of wheels are two cross-beams, $b\,b$, bolted to the frame and arranged to support the motor M, which is insulated upon these beams, as shown in Fig. 3, connection being made through the back armatures, $a\,a'$, of the motor.

Fig. 3 illustrates the manner of attachment, which is the same for both, but partly refers to the back armature, $a$. To the cross-beams $b$ are fixed upright bolts $e\,e'$, having at the lower ends heads $d\,d'$. These bolts are surrounded by tubular insulating material, $f$, having flanges $f'$ $f^2$. Holes are made in the armature of sufficient size to receive the insulating material, and the armature is held upon the bolts by nuts on the upper ends, the armature resting upon the lower flange, and the nuts bearing upon the upper flanges of the tubular insulating material.

The shaft of the motor is represented at 3. The pinion P, Fig. 1, is on the end of the shaft of the motor M, and is carefully insulated from it, in the manner shown in Fig. 4, in which $p$ is the pinion proper, insulated from the flanges $v$ and $r$ by the insulating material $i$ $i$ $i$, and held in place by the bolts $o$ $o'$. The flange $v$ is fixed to the shaft and the flange $r$ is loose. The bolts pass through them, as shown in the figure. The pinion P, Fig. 1, drives a large gear, G, carried on a counter-shaft, S, having its bearings at V and U, the bearings being held on the cross-beams $b$ $b$ and $b$ $b$. The counter-shaft also carries the bevel-gear H, which drives the two gears I and J, one in one direction and the other in the other direction. These two gears are free to turn on the axle $x'$, and not until the clutch K is thrown into one or the other will the motion be communicated to the axle $x'$, and the direction in which the locomotive moves will be determined by the gear into which the clutch is forced. The clutch is moved by the arm $n$ on the shaft R′, and this is turned from one side to the other by the lever L or L′ at either end of the locomotive or car. A sprocket-wheel is placed on each of the axles $x$ and $x'$ at $s$ and $s'$, and an endless chain connects $w$ $w$ to move with the wheels $w'$ $w'$, thus giving the benefit of the tractions of all four wheels.

Having thus described my invention, I claim—

1. In combination, the frame, the upright bolts $e$ $e'$, the insulation $f$ $f$, the shaft 3, the pinion P on said shaft, meshing with the gear-wheel G, said pinion being held to the shaft by the parts $v$, $o$, and $r$, and the insulating material $i$, substantially as described.

2. In combination, the frame, the motor insulated therefrom, the shaft 3, the pinion P, and the insulation between said shaft and pinion, substantially as described.

In testimony whereof I have signed my name to this specification in the presence of two subscribing witnesses.

SIDNEY HOWE SHORT.

Witnesses:
RODNEY CURTIS,
EDWARD GRACE.